United States Patent [19]

McClellan

[11] 4,359,283
[45] Nov. 16, 1982

[54] JUICE CONTAINER AND STIRRER

[75] Inventor: Thomas A. McClellan, Windsor, Canada

[73] Assignee: Sperry Corporation, Troy, Mich.

[21] Appl. No.: 258,622

[22] Filed: Apr. 29, 1981

[51] Int. Cl.³ .............................................. B01F 7/24
[52] U.S. Cl. ..................................... 366/247; 366/318
[58] Field of Search .............. 366/241, 279, 315, 317, 366/319, 322, 324, 242, 181, 247, 244, 245, 266, 318, 321, 323, 67; 198/676; 220/74; 99/510

[56] References Cited

U.S. PATENT DOCUMENTS

| | | | |
|---|---|---|---|
| 1,684,254 | 9/1928 | Bailey | 198/676 |
| 2,585,334 | 2/1952 | McCauley | 222/556 X |
| 3,044,437 | 7/1962 | Mainzer | 366/266 X |

FOREIGN PATENT DOCUMENTS 1069118  11/1959  Fed. Rep. of Germany ...... 366/318

Primary Examiner—Philip R. Coe
Assistant Examiner—Christine A. Peterson
Attorney, Agent, or Firm—Barnes, Kisselle, Raisch & Choate

[57] ABSTRACT

A juice container and stirrer comprising a container having a bottom wall, side wall and open upper end and a removable cover for the open end. A shaft is rotatably supported on the cover such that one portion of the shaft extends exteriorly of the container and another portion of the shaft extends internally substantially throughout the height of the container. A handle is provided on the outer end portion of the shaft for gripping and rotating the shaft. A helical vane extends radially outwardly along the portion of the shaft extending within the container. The helical vane has a cross section which includes a radially extending portion and wall adjacent the periphery of the radially extending portion extending axially toward the cover.

15 Claims, 1 Drawing Figure

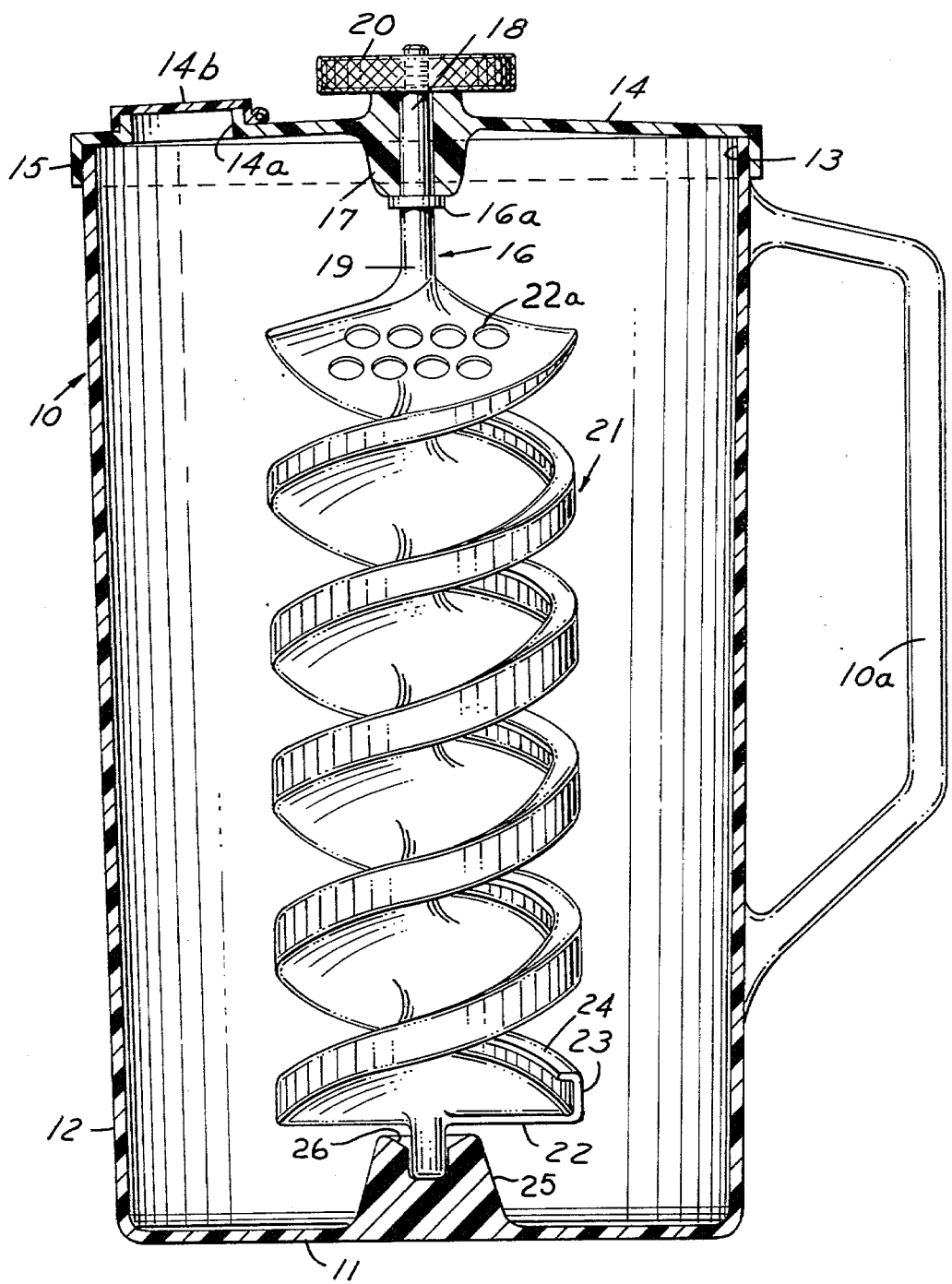

JUICE CONTAINER AND STIRRER

This invention relates to containers and stirrers for juices, particularly for home use.

BACKGROUND AND SUMMARY OF THE INVENTION

It is a common expedient in the home to utilize juices and to store them in containers. One of the problems with respect to fruit and vegetable juices is that the solid content tends to settle out as the juices are stored in the container requiring either shaking of the container and the resultant leakage or stirring with a spoon or other device.

Accordingly, among the objects of the present invention are to provide a juice container and stirrer wherein the juice can be readily stirred with a minimum of effort in order that the solids will be uniformly distributed throughout the juice; which is relatively simple in construction and low in cost; and which can be easily cleaned for reuse.

In accordance with the invention, the juice container and stirrer comprises a container having a bottom wall, side wall and open upper end and a removable cover for the open end. A shaft is rotatably supported on the cover such that one portion of the shaft extends exteriorly of the container and another portion of the shaft extends internally substantially throughout the height of the container. A handle is provided on the outer end portion of the shaft for gripping and rotating the shaft. A helical vane extends radially outwardly along the portion of the shaft extending within the container. The helical vane has a cross section which includes a radially extending portion and a wall adjacent the periphery of the radially extending portion extending axially toward the cover.

DESCRIPTION OF THE DRAWINGS

The single drawing is a cross-sectional view of a juice container and stirrer embodying the invention.

DESCRIPTION

Referring to the drawing, the juice container and stirrer embodying the invention comprises a container 10 including a bottom wall 11, a side wall 12 with an open upper end 13 and handle 10a. A cover 14 is mounted on the container. The cover 14 has a peripheral flange 15 frictionally engaging the end 13.

Cover 14 and upper end 13 may be provided with interengaging means such as ribs and the flange 15 may engage the interior rather than the exterior surface of the upper end 13 of the container. Cover 14 may also be formed with a dispensing opening 14a having a removable cover 14b.

A shaft 16 is rotatably mounted centrally of the cover by a bearing 17 formed integrally with the cover. The shaft 16 includes an outer end portion 18 and an inner end portion 19 extending within the container substantially throughout the length of the container. A knob 20 is threaded on the outer end portion for gripping the shaft for rotation, as presently described. The knob 20 engages a shoulder on the shaft to limit the movement onto the shaft. A flange 16a on shaft 16 engages boss or bearing 17 to limit the outward movement of shaft.

A helical vane 21 is formed as a portion 19 of the shaft within the container and extends throughout the portion 19 of the shaft within the container. The vane 21 includes a radially extending portion 22 that has a substantially constant width, a peripheral wall portion 23 of substantially constant height extending axially toward the cover 14 and a flange or lip 24 extending radially inwardly from the upper edge of wall 23. The peripheral wall portion 23 and flange 24 taper toward and merge into the plane of the radially extending portion 22 in the area of the cover.

The radially extending portion 22 of vane 21 nearest the cover 14 is formed with openings 22a to facilitate circulation of the mixed juice to the remainder of the juice in the container. The vane 21 has a substantially constant pitch and extends for several convolutions about the shaft.

The lower end of shaft 16 is preferably laterally restrained in an integral boss 25 extending upwardly from the bottom wall 11 and having a recess 26 for rotatably supporting the end of the shaft.

In use, the juice is stored in the container and stirrer and when the juice is to be used, the user turns the knob 20 one or more revolutions causing the juice to be stirred. Each revolution of the vane 21 not only agitates the juice but causes it to move up the vane since rotation, in effect, threads the vane into the juice forcing the juice to rise vertically. The peripheral wall 23 and flange 24 tend to confine the juice so that the juice is caused to move from the bottom to the top, leaving the confines of the vane where the wall 23 and flange 24 taper into the plane of the radially extending portion 22 of the vane 21.

Where the person using the juice container and stirrer is right handed, the vane 21 is preferably formed with a right hand thread as viewed from the top.

The container, cover, shaft and vane are preferably made of plastic material to facilitate handling and cleaning.

I claim:

1. A juice container and stirrer comprising
 a container having a bottom wall, side wall and open upper end,
 a removable cover for the open end,
 a shaft,
 means for rotatably supporting the shaft on the cover such that a portion of the shaft extends exteriorly of the container and another portion of the shaft extends internally substantially throughout the height of the container,
 handle means on the outer end portion of the shaft for gripping and rotating the shaft,
 helical vane means extending radially outwardly along the length of the shaft extending within the container,
 said helical vane means having a cross section which includes a radially extending portion and an axially extending peripheral wall portion adjacent the periphery of the radially extending portion and toward the cover,
 said vane means including a flange portion extending radially inwardly from the peripheral wall portion.

2. A juice container and stirrer comprising
 a container having a bottom wall, side wall and open upper end,
 a removable cover for the open end,
 a shaft,
 means for rotatably supporting the shaft on the cover such that a portion of the shaft extends exteriorly of the container and another portion of the shaft extends internally substantially throughout the height of the container, handle means on the outer end portion of the shaft for gripping and rotating the shaft, helical vane means extending radially outwardly along the length of the shaft extending within the container, said helical vane means having a cross section which includes a radially extending portion and an axially extending peripheral wall portion adjacent the periphery of the radially extending portion and toward the cover, said helical vane extending throughout the major portion of the shaft within the container, the axially extending wall portion of the vane nearest the cover tapering axially inwardly toward the plane of the radially extending portion.

3. The juice container and stirrer set forth in claim 2 wherein said helical vanes comprise a single vane.

4. The juice container and stirrer set forth in claim 2 wherein said helical vane has a constant pitch.

5. The juice container and stirrer set forth in claim 2 wherein said vane has a constant radial width.

6. The juice container and stirrer set forth in claim 2 wherein said vane includes a plurality of openings in the radially extending portion thereof adjacent the end of the shaft nearest the cover.

7. The juice container and stirrer set forth in claim 2 wherein said means for rotatably mounting said shaft prevents the shaft from moving axially outwardly.

8. The juice container and stirrer set forth in claim 2 wherein said means rotatably mounting said shaft prevents the shaft from moving axially inwardly.

9. The juice container and stirrer set forth in claim 2 wherein said container, cover and shaft are made of plastic material.

10. The juice container and stirrer set forth in claim 2 wherein said handle means comprises a knob.

11. The juice container and stirrer set forth in claim 2 including bearing means on the bottom wall of said container for supporting the lower end of said shaft.

12. A juice container and stirrer comprising a plastic container having a bottom wall, side wall and open upper end, a removable plastic cover for the open end, a shaft, means for rotatably supporting the shaft on the cover such that a portion of the shaft extends exteriorly of the container and another portion of the shaft extends internally substantially throughout the height of the container, a handle on the outer end portion of the shaft for gripping and rotating the shaft, a helical vane extending radially outwardly along the length of the shaft extending within the container, said helical vane having a cross section which includes a radially extending portion, an axially extending wall portion adjacent the periphery of the radially extending portion and toward the cover, and a flange portion extending radially inwardly from the upper edge of said peripheral wall portion, said helical vane extending throughout the major portion of the shaft within the container, said peripheral wall portion and said flange portion of the vane nearest the cover tapering axially inwardly toward the plane of the radially extending portion.

13. The juice container and stirrer set forth in claim 12 wherein said shaft and vane are made of plastic material.

14. The juice container and stirrer set forth in claim 12 including bearing means on the bottom wall of said container for supporting the lower end of said shaft.

15. A juice container and stirrer comprising a container having a bottom wall, side wall and open upper end, a removable cover for the open end, a shaft, means for rotatably supporting the shaft on the cover such that a portion of the shaft extends exteriorly of the container and another portion of the shaft extends internally substantially throughout the height of the container, handle means on the outer end portion of the shaft for gripping and rotating the shaft, helical vane means extending radially outwardly along the length of the shaft extending within the container, said helical vane means having a cross section which includes a radially extending portion and an axially extending peripheral wall portion adjacent the periphery of the radially extending portion and toward the cover, the peripheral wall portion of the vane tapering toward the radially extending portion in the upper end of the vane adjacent the cover.

* * * * *

UNITED STATES PATENT AND TRADEMARK OFFICE
CERTIFICATE OF CORRECTION

PATENT NO. : 4,359,283
DATED : November 16, 1982
INVENTOR(S) : Thomas A. McClellan It is certified that error appears in the above-identified patent and that said Letters Patent is hereby corrected as shown below:

On the title page delete item [73] assignee.

Signed and Sealed this

Twenty-second Day of February 1983

[SEAL]

Attest:

GERALD J. MOSSINGHOFF

Attesting Officer   Commissioner of Patents and Trademarks